(12) United States Patent
Sheldrake (10) Patent No.: US 7,963,299 B2
(45) Date of Patent: Jun. 21, 2011

(54) HEAT DISSIPATION

(75) Inventor: Terence Henry Sheldrake, Sunderland (GB)

(73) Assignee: Wellstream International Limited, Newcastle-Upon-Tyne (GB)

(*) Notice: Subject to any disclaimer, the term of this patent is extended or adjusted under 35 U.S.C. 154(b) by 221 days.

(21) Appl. No.: 12/252,255

(22) Filed: Oct. 15, 2008

(65) Prior Publication Data

US 2009/0151789 A1 Jun. 18, 2009

(30) Foreign Application Priority Data

Dec. 18, 2007 (GB) .................................. 0724594.7

(51) Int. Cl.
*F16L 57/00* (2006.01)
(52) U.S. Cl. .......... 138/110; 138/172; 138/109; 138/38; 285/41
(58) Field of Classification Search .................. 138/110, 138/109, 112, 114, 38; 285/41
See application file for complete search history.

(56) References Cited

U.S. PATENT DOCUMENTS

| | | | | |
|---|---|---|---|---|
| 4,367,967 A * | 1/1983 | Albert, Jr. | ....................... | 403/41 |
| 5,343,738 A | 9/1994 | Skaggs | | |
| 6,009,907 A * | 1/2000 | Secher | .......................... | 138/110 |
| 6,039,083 A * | 3/2000 | Loper | ........................... | 138/135 |
| 6,220,303 B1 * | 4/2001 | Secher et al. | ................. | 138/110 |
| 7,069,958 B2 * | 7/2006 | Filho et al. | ..................... | 138/153 |
| 7,210,504 B2 * | 5/2007 | Filho et al. | ..................... | 138/153 |

FOREIGN PATENT DOCUMENTS

| | | |
|---|---|---|
| FR | 2760813 A | 9/1998 |
| GB | 2291686 A | 1/1996 |

OTHER PUBLICATIONS

Search Report from the European Patent Office for corresponding European Application No. EP08166477.3-1252, May 29, 2009, 7 pages.
ExaminationReport from the European Patent Office for corresponding European Application No. EP08166477.3, dated Oct. 5, 2010, 5 pages.
Observation Pursuant to Article 115 EPC, filed with European Patent Office, for corresponding European Application No. EP08166477.3, Feb. 21, 2011, 3 pages.
Recommended Practice for Flexible Pipe—API Recommended Practice 17B (RP 17B), First Edition, Jun. 1, 1988, 39 pages.

* cited by examiner

*Primary Examiner* — Patrick F Brinson
(74) *Attorney, Agent, or Firm* — Klarquist Sparkman, LLP (57) ABSTRACT

A method and apparatus are disclosed for dissipating heat from a region of flexible pipe covered by a bend stiffener. The method includes the steps of, via at least one channel in an outer surface around a flexible pipe, providing a flow path for water to flow from a region of the flexible pipe covered by a bend stiffener to an uncovered region of the flexible pipe.

13 Claims, 6 Drawing Sheets

HEAT DISSIPATION

CROSS REFERENCE TO RELATED APPLICATION

The present application claims priority to Great Britain Application No. GB0724594.7, filed Dec. 18, 2007, which is incorporated herein by reference.

FIELD

The present invention relates to flexible pipe of the type suitable for transportation of production fluids. In particular, but not exclusively, the present invention relates to a method of dissipating heat from a region of flexible pipe covered by a bend stiffener.

BACKGROUND

Traditionally flexible pipe is utilized to transport production fluids, such as oil and/or gas and/or water, from one location to another. Flexible pipe is particularly useful in connecting a sub-sea location to a sea level location. Flexible pipe is generally formed as an assembly of a flexible pipe body and one or more end fittings. The pipe body is typically formed as a composite of layered materials that form a fluid and pressure-containing conduit. The pipe structure allows large deflections without causing bending stresses that impair the pipe's functionality over its lifetime. The pipe body is generally, but not necessarily, built up as a composite structure including metallic and polymer layers.

Flexible pipe may be utilized as a flowline over land and/or at a sub-sea location. Flexible pipe may also be used as a jumper or riser.

A flexible riser is a flexible pipe used to connect a compliant top side structural system with a sea bed location. A flexible riser system can be designed for many types of floating production structures and some well known riser configurations are free hanging catenary risers, lazy "S" risers, lazy "wave" risers, steep "wave" risers or the like. Such configurations are selectively suitable for use in shallow, medium, deep or ultra deep water depths.

During use it is appreciated that a flexible pipe is subjected to dynamic loading due to a number of possible conditions, for example due to motion of a vessel or platform on a surface of sea. Surge motion and heave motion of such surface bound vessel can particularly cause curvature changes in a riser configuration. Dynamic loading can also occur due to content density changes in the flexible pipe and current/tidal effects. Over bending can also occur when the flexible pipe is installed. It is generally advantageous to prevent shape changes or control such changes within predetermined limits when loading occurs.

One particular problem which is well known where flexible pipe is forced to bend is that the pipe may be damaged if the pipe is bent through too tight a radius. A recognized solution to this problem is the fitting of a bend stiffener at locations where the flexible pipe body is likely to be subjected to over flexing particularly at the interface between the pipe and an end termination or at the interface with a topside structure. The bend stiffener typically comprises a flexible molded polyurethane body having a generally tapered cross section. The thick end of the bend stiffener which is substantially rigid can be secured to fixed points. A degree of bending allowed for the flexible pipe steadily increases towards a tapered narrow end of the bend stiffener. During operation substantial heating can occur at the interface between the stiffener flexible casing and the flexible pipe body. Also the interface between the flexible pipe and bend stiffener tends to be subject to relatively high temperatures due to the lack of a means to limit the temperature (sea water cools a remainder of the flexible pipe) and the high temperatures of the transported production fluids. The heat can cause a deleterious effect to the working lifetime of the flexible pipe and bend stiffener arrangement.

A partial solution to this problem has been suggested in U.S. Pat. No. 6,009,907. Here a stiffener designed for fitting to a flexible conduit for use in a marine environment is disclosed. The stiffener comprises a flexible case located at least partially over the flexible pipe with structures in the bend stiffener being included to form channels which can be used to dissipate heat at the interface between the stiffener and flexible conduit.

However, the solution posed in the '907 patent requires the use of complex parts for a bend stiffener to be manufactured which can increase costs and installation times. Also, the channels in the bend stiffener proposed do not extend along the full length of the bend stiffener covering the flexible pipe. As a result areas under the stiffener are not irrigated and thus cooling water is not circulated across the full region of flexible pipe body surrounded by the bend stiffener. Heat is thus not effectively removed from areas of the interface which can have a negative effect on the lifespan of the pipeline.

It is an aim of embodiments the present technology to at least partly mitigate the above-mentioned problems.

It is an aim of embodiments of the present technology to provide a method for dissipating heat from a region of flexible pipe covered by a bend stiffener.

It is an aim of embodiments of the present technology to dissipate heat from a whole region of flexible pipe surrounded by a bend stiffener.

It is an aim of embodiments of the present technology to provide a method of dissipating heat from a region of flexible pipe body covered by a bend stiffener utilizing a methodology which is relatively cost effective to manufacture and simple to install.

According to a first aspect of the present technology there is provided a method of dissipating heat from a region of flexible pipe covered by a bend stiffener, comprising the steps of:

via at least one channel in an outer surface around a flexible pipe, providing a flow path for water to flow from a region of the flexible pipe covered by a bend stiffener to an uncovered region of the flexible pipe.

According to a second aspect of the present technology there is provided flexible pipe body for transporting production fluids, comprising:

a plurality of coaxially orientated layers; and at least one channel in an outer surface around the flexible pipe, each channel providing a flow path for water to flow from a region of the flexible pipe body covered by a bend stiffener to an uncovered region.

According to a third aspect of the present technology, a method of transporting a fluid comprises:

providing a flexible pipe comprising a plurality of coaxially orientated layers, at least one channel in an outer surface around the flexible pipe, each channel providing a flow path for water to flow from a region of the flexible pipe body covered by a bend stiffener to an uncovered region, and at least one end fitting; and transporting fluid through the flexible pipe.

Embodiments of the present technology provide a practical solution for dissipating heat from a region of flexible pipe covered by a bend stiffener. By forming channels in an outer surface of a flexible pipe or in an outer surface of a sleeve slid over the flexible pipe water can be made to flow along channels to constantly remove heat from the annulus region at the interface between the bend stiffener and flexible pipe body or outer sleeve.

The channels may be either machined or molded into the outer surface of the flexible pipe or the outer sleeve in a very convenient process to provide paths by which seawater can circulate and thus moderate the temperature. As a result time consuming and costly manufacture of a bend stiffener is obviated. Also installation times are reduced. Water flows through the channels by natural convection due to thermal gradients and/or the dynamic motion of the flexible pipe and bend stiffener which causes a pumping action. The interface is thus automatically and repeatedly cooled.

The foregoing and other features and advantages of the technology will become more apparent from the following detailed description, which proceeds with reference to the accompanying figures.

BRIEF DESCRIPTION OF THE DRAWINGS

Embodiments of the present technology will now be described hereinafter, by way of example only, with reference to the accompanying drawings in which.

In the drawings like reference numerals refer to like parts.

DETAILED DESCRIPTION

Figure 1:
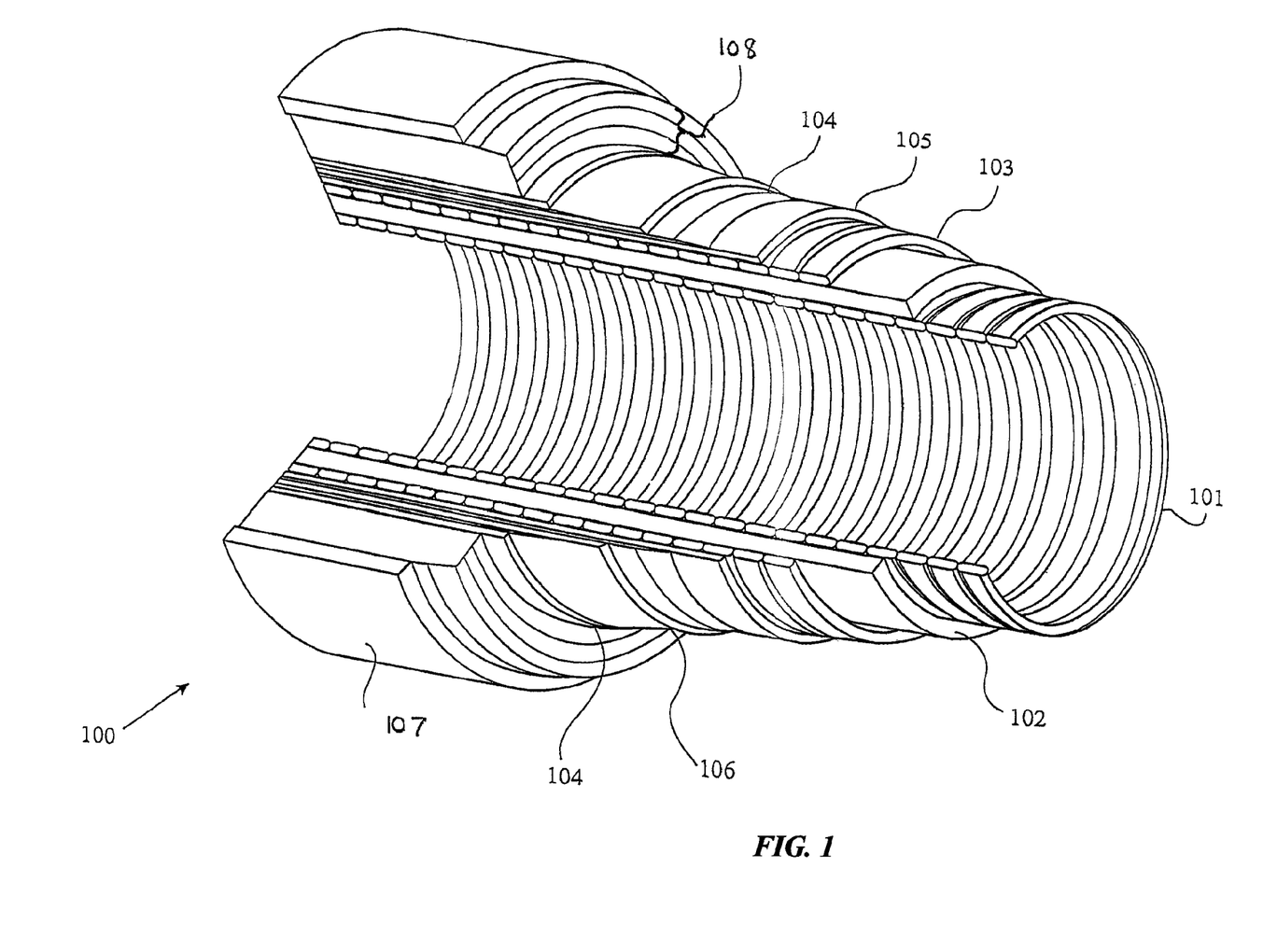
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 100 is formed in accordance with one embodiment from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body typically includes an innermost carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads. It will be appreciated that embodiments of the present invention are applicable to 'smooth bore' as well as such 'rough bore' applications.

The internal pressure sheath 102 acts as a fluid retaining layer and typically comprises a polymer layer that ensures internal-fluid integrity. It is to be understood that this layer may itself comprise a number of sub-layers. It will be appreciated that when the optional carcass layer is utilized the internal pressure sheath is often referred to as a barrier layer. In operation without such a carcass (so-called smooth-bore operation) the internal pressure sheath may be referred to as a liner.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes an outer sheath 107 which comprises a polymer layer used to protect the pipe against penetration of seawater and other external environments, corrosion, abrasion and mechanical damage. One or more layers 108 of insulation may also be included.

Each flexible pipe comprises at least one portion, sometimes referred to as a segment or section of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
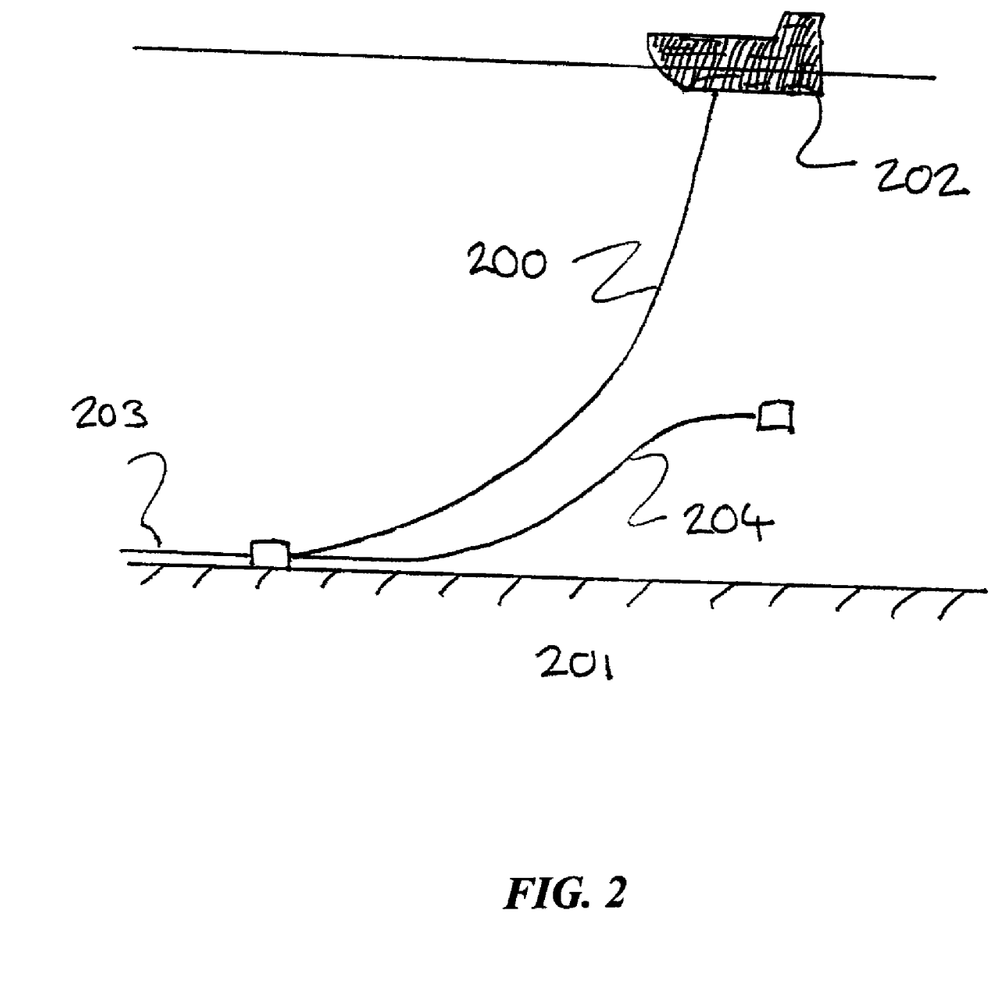
FIG. 2 illustrates a riser, flowline and jumper.

FIG. 2 illustrates a riser assembly 200 suitable for transporting production fluid such as oil and/or gas and/or water from a sub-sea location 201 to a floating facility 202. For example, in FIG. 2 the sub-sea location 201 is a connection to a sub-sea flow line 203. The flexible flow line comprises a flexible pipe, wholly or in part, resting on the sea floor or buried below the sea floor. The floating facility may be provided by a platform and/or buoy or, as illustrated in FIG. 2, a ship. The riser 200 is provided as a flexible riser, that is to say a flexible pipe connecting the ship to the sea floor installation. Alternatively the flexible pipe can be used as a jumper 204.

Figure 3:
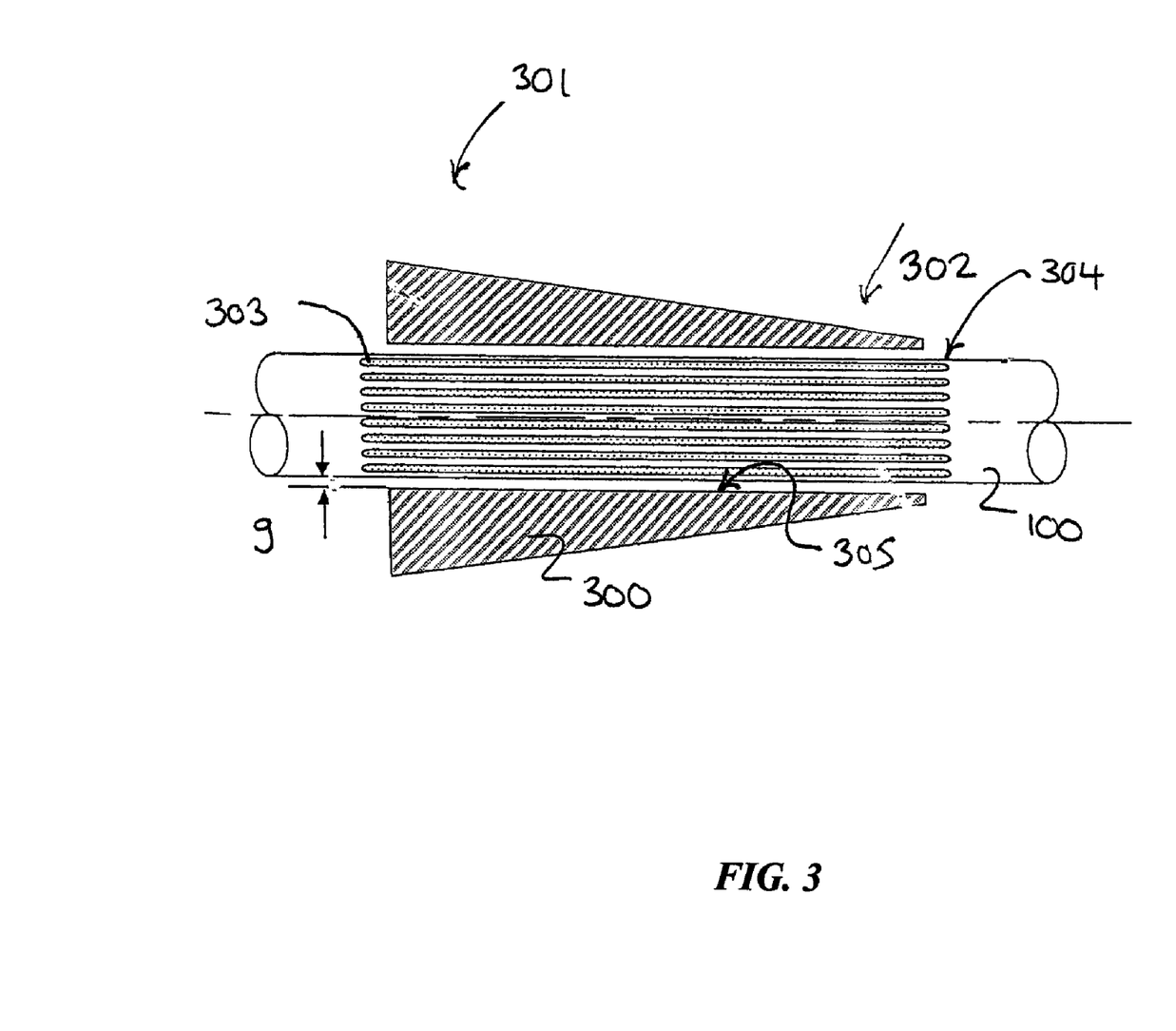
FIG. 3 illustrates a bend stiffener.

FIG. 3 illustrates a bend stiffener 300 surrounding a portion of flexible pipe body 100. The bend stiffener 300 is a substantially tapered structure having a relatively thick cross section at a first end region 301 and a relatively narrow thickness at a tapered end region 302. Typically the bend stiffener is manufactured from a polymeric material. The thick end of the bend stiffener is substantially rigid and can thus be secured to a solid structure such as a ship, platform or fitting. The thickness and material selected for the bend stiffener means that the bend stiffener provides a substantially rigid support for the flexible pipe. The tapered cross section means that the flexibility offered by the bend stiffener increases towards the narrow tapered end. The support offered by the bend stiffener at the tapered end enables flexing and bending of the flexible pipe.

Elongate channels 303 are formed in an outer surface of the outer sheath of the flexible pipe body. The channels extend along the whole or part of the region of the flexible pipe body surrounded by the bend stiffener. Whilst the channels illustrated in FIG. 3 are shown as being straight elongate channels, it will be appreciated that the channels may be helically formed winding around the flexible pipe body.

As illustrated in FIG. 3, a gap g exists between the outer surface 304 of the flexible pipe body and an inner surface 305 of the bend stiffener. An annular region is thus formed between the bend stiffener and outer surface of the flexible pipe body. It will be appreciated that whilst in this example the channels 303 are shown formed in an outer surface of an outer sheath of the flexible pipe, it is optionally possible to provide a sleeve which could be slid over the outer sheath of the flexible and in which the channels were formed. In such an alternative embodiment of the present invention the inner dimensions of the bend stiffener and outer dimensions of the sleeve are predetermined so as to provide a suitable gap g between the bend stiffener and sleeve.

Figure 4:
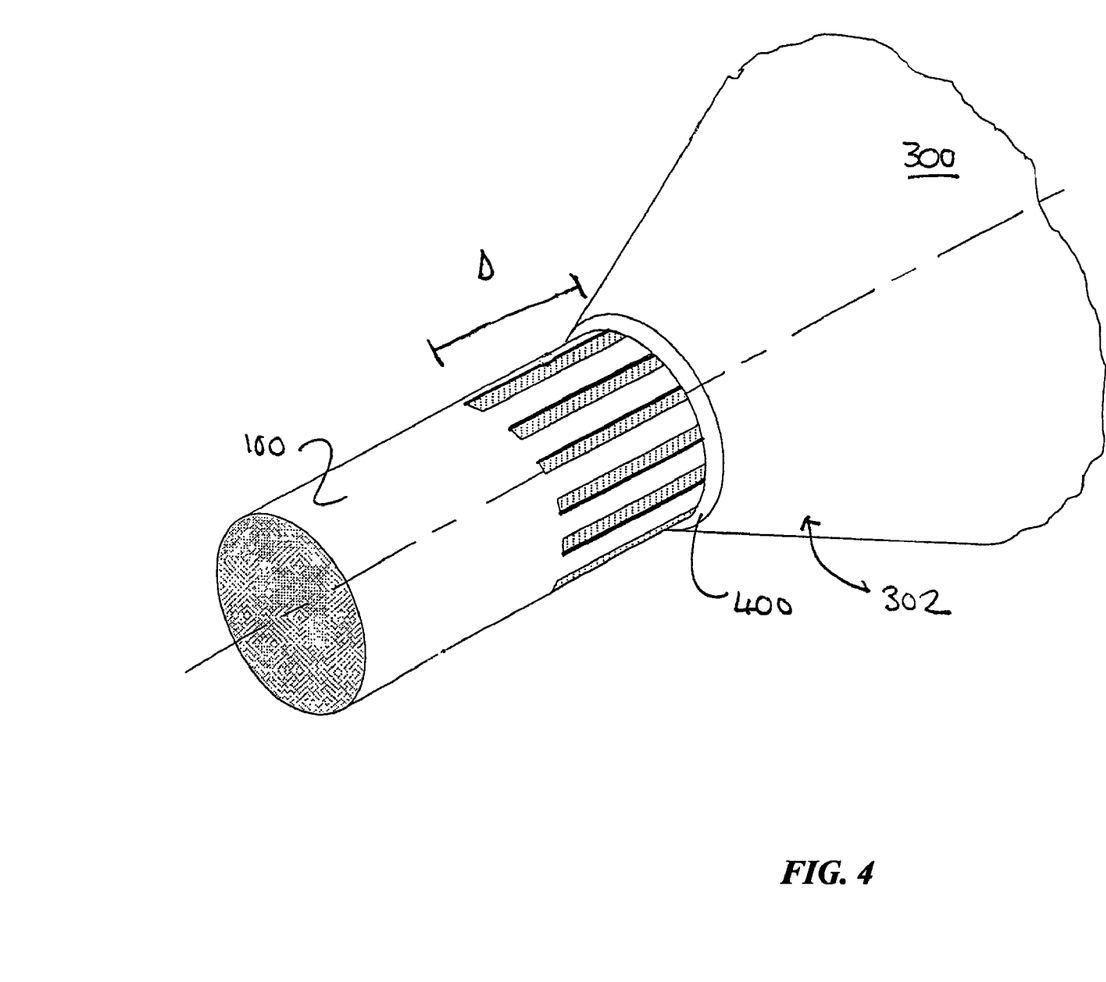
FIG. 4 illustrates channels running under a tapered end of a bend stiffener.

FIG. 4 illustrates an end 400 at the tapered end region 302 of the bend stiffener 300. Elongate channels are formed circumferentially in a parallel spaced apart relationship around the outer surface of the flexible pipe body 100 so that the channels extend a distance D beyond the end 400 of the bend stiffener. Aptly channels extend a similar distance beyond the remaining end of the bend stiffener. The channels in the external sheath thus pass beyond the limits of the bend stiffener to create a flow path for sea water. The cooling water will circulate by either natural convection due to thermal gradients and/or the dynamic motion of the flexible pipe and bend stiffener in service. In fact the clearance between the bend stiffener and flexible pipe body provide a pumping action as the clearance opens and closes during service when flexing occurs.

Figure 5:
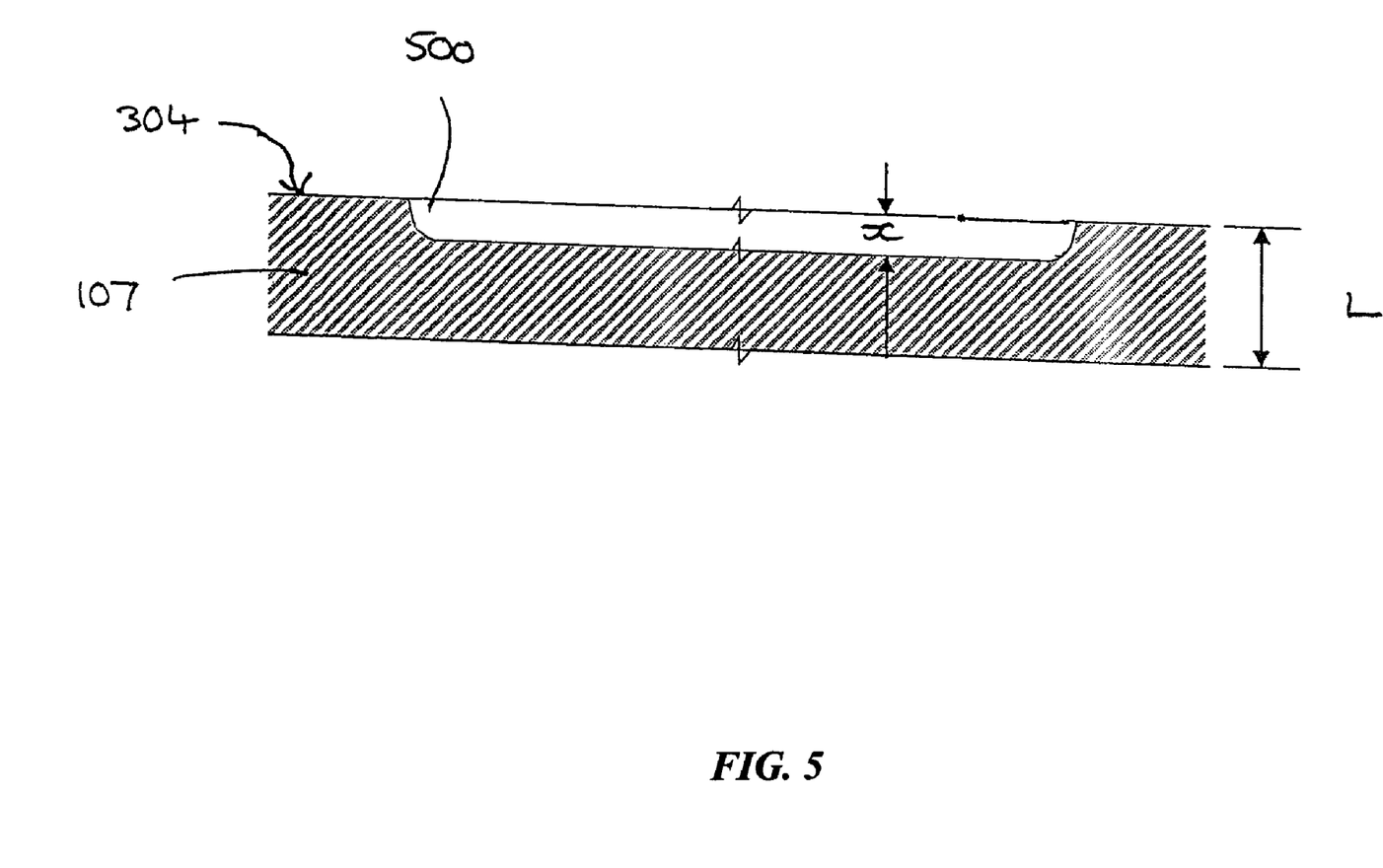
FIG. 5 illustrates channels in an outer sheath.
Figure 6:
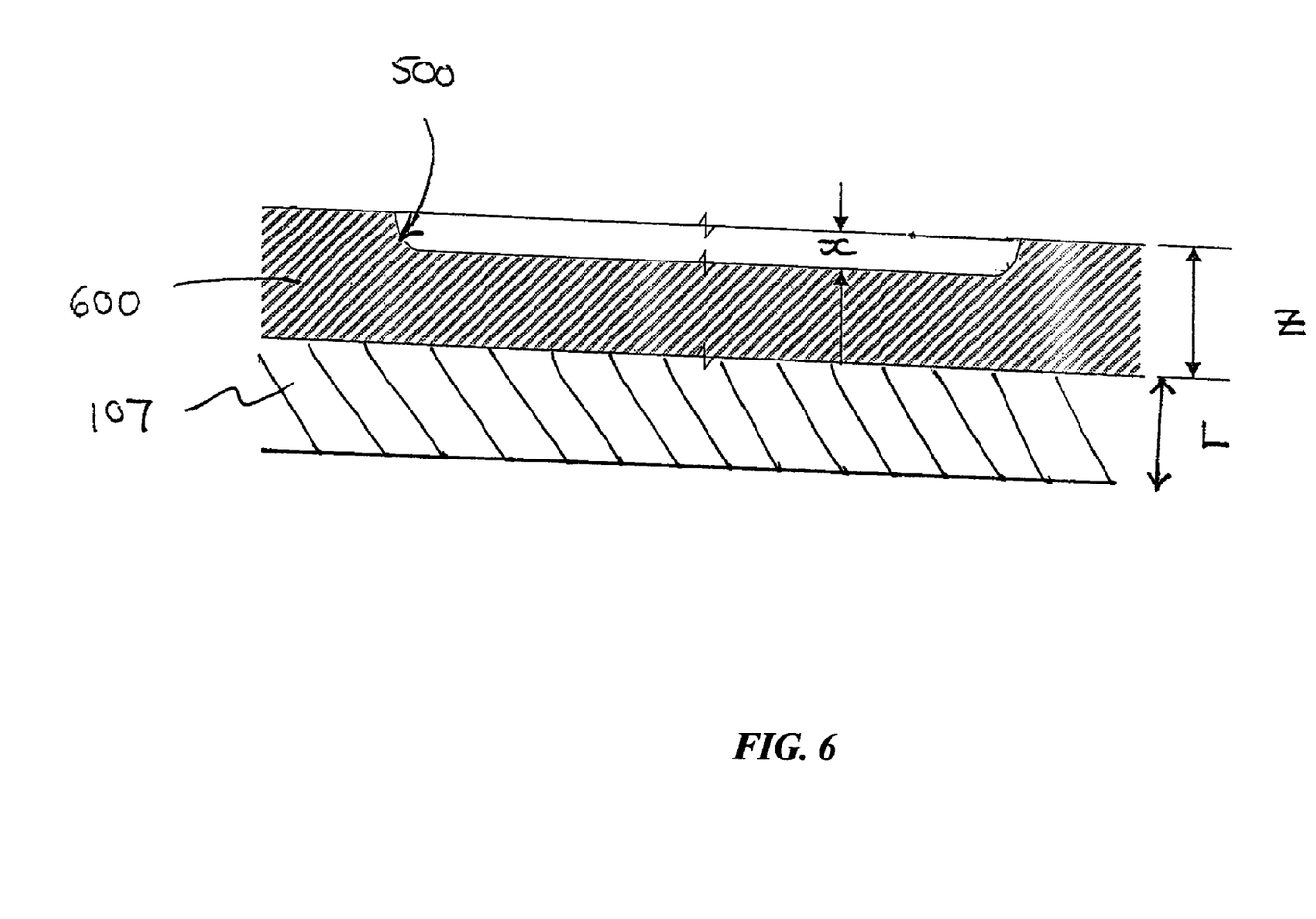
FIG. 6 illustrates channels in a sleeve.

FIGS. 5 and 6 illustrate how channels can be formed in an outer sheath 107 of the flexible pipe body or alternatively in an abrasion layer added as an outer sleeve. As illustrated in FIG. 5 the outer sheath 107 has a thickness L with channels having a depth x recessed into the outer surface. The depth and shape of the channels are determined prior to manufacture from analysis of the thermal performance of a design. The ends 500 of the channels may be square or aptly fluted to reduce the risk of fatigue fractures of the external polymer sheath.

FIG. 6 illustrates how channels can be recessed into an outer surface of a sleeve 600 slid over the outer sheath 107 of the flexible pipe body. The sleeve is slid over the flexible pipe body during installation to cover the whole or a part of the flexible pipe surrounded by a bend stiffener. The outer sleeve 600 has a thickness Z thick enough to allow channels having a desired depth x to be formed therein.

During use flexing of the flexible pipe within the bend stiffener can generate heating effects. However, generally heat will occur at an interface between flexible pipe body and a bend stiffener due to the relatively high temperatures of production fluids being transported by the flexible pipe. Where a bend stiffener is utilized this has, in the past, precluded cooling effects of seawater at the annular region forming an interface between the flexible pipe and bend stiffener. The present invention overcomes this problem by forming recessed channels which extend either in a straight manner along the outer surface or which wind helically in a spaced apart relationship around the outer surface. Aptly embodiments of the present invention are suitable for high temperature operations which require the use of a bend stiffener. In such high temperature operations the interface between the bend stiffener and flexible pipe can otherwise reach high temperatures which might exceed the operating limits of polymers employed. Embodiments of the present invention can prevent such high temperatures being reached by providing a means by which cooling can continuously and automatically be achieved.

The channels in the outer surface of the outer sheath or outer sleeve can be created in a highly convenient manner and thus embodiments of the present technology can be provided in a cost effective and timely fashion.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method of dissipating heat from a region of flexible pipe covered by a bend stiffener, the method comprising:
   via at least one channel in an outer surface of the flexible pipe, providing a flow path for water to flow from a region of the flexible pipe covered by the bend stiffener to an uncovered region of the flexible pipe.

2. The method as claimed in claim 1, further comprising:
   circulating water along a plurality of elongate channels extending longitudinally in the outer surface.

3. The method as claimed in claim 1, further comprising:
   circulating water along one or more channels extending helically around the outer surface.

4. The method as claimed in claim 1, further comprising:
   circulating water along the flow path via natural convection due to thermal gradients or the dynamic motion of the flexible pipe and bend stiffener.

5. Flexible pipe body for transporting production fluids such as oil, gas or water from a sub-sea location, comprising:
   a plurality of coaxially orientated layers; and
   at least one channel in an outer surface of the flexible pipe, each channel providing a flow path for water to flow from a region of the flexible pipe body covered by a bend stiffener to an uncovered region.

6. The flexible pipe body as claimed in claim 5, wherein:
   each channel comprises a recessed groove machined or molded into an outer surface of an outer sheath of the flexible pipe.

7. The flexible pipe body as claimed in claim 6, wherein each channel comprises a first and second end and each end of each channel is fluted.

8. The flexible pipe body as claimed in claim 5, wherein:
   the bend stiffener has a first and second end and each channel extends beyond at least one end of the bend stiffener.

9. The flexible pipe body as claimed in claim 8 wherein each channel extends beyond both the first and second ends of the bend stiffener.

10. A flexible pipe for transporting production fluids, comprising:
    the flexible pipe body as claimed in claim 5; and
    at least one end fitting.

11. The flexible pipe as claimed in claim 10, further comprising:
    a bend stiffener covering a region of the flexible pipe body.

12. A riser or jumper comprising the flexible pipe as claimed in claim 10.

13. A method of transporting a fluid such as oil, gas or water from a sub-sea location comprising:

provrding a flexible pipe comprising a plurality of coaxially orientated layers, at least one channel in an outer surface of the flexible pipe, each channel providing a flow path for water to flow from a region of the flexible pipe body covered by a bend stiffener to an uncovered region, and at least one end fitting; and transporting fluid through the flexible pipe.

* * * * *